United States Patent
He et al.

(10) Patent No.: US 11,778,196 B2
(45) Date of Patent: Oct. 3, 2023

(54) METHOD AND CIRCUIT SYSTEM FOR COMPRESSING VIDEO SIGNALS BASED ON ADAPTIVE COMPRESSION RATE

(71) Applicant: REALTEK SEMICONDUCTOR CORP., Hsinchu (TW)

(72) Inventors: Dong-Yu He, Suzhou (CN); Jing Sun, Suzhou (CN); Jian Sun, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 121 days.

(21) Appl. No.: 17/548,658

(22) Filed: Dec. 13, 2021

(65) Prior Publication Data

US 2022/0191507 A1 Jun. 16, 2022

(30) Foreign Application Priority Data

Dec. 14, 2020 (CN) .......................... 202011471798.X (51) Int. Cl.
*H04N 19/14* (2014.01)
*H04N 19/172* (2014.01)
*H04N 19/124* (2014.01)
*H04N 19/146* (2014.01)

(52) U.S. Cl.
CPC ........... *H04N 19/14* (2014.11); *H04N 19/124* (2014.11); *H04N 19/146* (2014.11); *H04N 19/172* (2014.11)

(58) Field of Classification Search
CPC .... H04N 19/14; H04N 19/124; H04N 19/146; H04N 19/172
See application file for complete search history.

(56) References Cited

U.S. PATENT DOCUMENTS

| | | | |
|---|---|---|---|
| 2010/0232721 A1* | 9/2010 | Yang | H04N 19/172 375/240.03 |
| 2015/0373328 A1* | 12/2015 | Yenneti | H04N 19/31 375/240.03 |
| 2021/0274169 A1* | 9/2021 | Takano | H04N 19/172 |

FOREIGN PATENT DOCUMENTS

| | | |
|---|---|---|
| CN | 1852438 A | 10/2006 |
| CN | 101835038 A | 9/2010 |

* cited by examiner

*Primary Examiner* — Kyle M Lotfi
(74) *Attorney, Agent, or Firm* — Li & Cai Intellectual Property (USA) Office (57) ABSTRACT

A method for compressing video signals based on adaptive compression rate and a circuit system thereof are provided. In the method, a digital signal processor is used to process a video so as to frame-by-frame obtain statistical data, for example, a maximum of compressed data. The maximum of compressed data of a previous frame is used to determine a compression state of a current frame. The compression state of the frame allows the processor to decide a direction to adjust a compression ratio. Next, statistical data of the previous frame is used to decide a stride to adjust the compression ratio. The statistical data can be a maximum of compressed data and a quantization table scale referred to rendering a prediction curve that allows the processor to determine the stride. A compression ratio is then determined according to the direction and the stride of adjustment.

20 Claims, 7 Drawing Sheets

METHOD AND CIRCUIT SYSTEM FOR COMPRESSING VIDEO SIGNALS BASED ON ADAPTIVE COMPRESSION RATE

CROSS-REFERENCE TO RELATED PATENT APPLICATION

This application claims the benefit of priority to Patent Application No. 202011471798.X, filed on Dec. 14, 2020 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is related to a technology for video compression, and more particularly to a method and a circuit system for video compression that is to adaptively adjust a compression rate based on degree of complexity of a previous frame.

BACKGROUND OF THE DISCLOSURE

MJPEG (motion JPEG, Motion Joint Photographic Experts Group) is a multimedia format that is developed for frame-by-frame video compression based on JPEG technology. Main feature of MJPEG compression technology is not to encode the difference among frames of a video but to compress each individual frame. The MJPEG compression technology does not consider the changes among the frames in the video. Therefore, the MJPEG compression technology only requires low complexity of computation and low computing power. The MJPEG compression technology has been widely used in a webpage browser, a media player, a digital camera, a webcam, etc.

Conventional MJPEG compression technology adopts a fixed compression rate for compressing a video, and has poor adaptability for various scenes. When the MJPEG compression technology is used in a complex scene, it may cause the video appearing to be stuck in a frame or to have a lost frame. When the MJPEG compression technology is used in a simple scene or a common scene, the definition of the video may be dropped due to a large compression rate. In general, the scenes in a video should be frequently changed, and therefore the MJPEG compression technology may not be appropriately adapted to the various scenes. A more adaptable MJPEG video compression technology is required.

SUMMARY OF THE DISCLOSURE

For providing a video compression technology that is able to adapt to various changes of scenes by referring to statistical data of adjacent frames, provided in the disclosure is related to a method for compressing video based on an adaptive compression rate and a circuit system thereof. The method is to adjust a compression rate adaptively based on a degree of complexity of images. The adaptive compression rate allows the compressed images to not only meet a frequency bandwidth but also be presented with a best visual effect.

The circuit system includes a digital signal processor that applies a specific compression technology. The circuit system can be disposed in an imaging device. Video data to be processed can be obtained through a lens and a photosensor. The video data is processed frame-by-frame. After acquiring a maximum of compressed data of a previous frame from the video, the maximum of compressed data can be used to determine a compression state of a current frame. The compression rate of the current frame needs not to be adjusted if the current frame is in a stable state. A direction of adjustment can be obtained according to a direction tending toward a stable compression rate if the current frame is determined to be within an under-compression range or an over-compression range. The direction of adjustment allows the compression rate of the current frame to be adjusted for tending toward a target compression rate.

Next, provided are several curves depicting relationships between maximum of compressed data for multiple scenes and quantization table scale. The scenes are such as a simple scene, a normal scene and a complex scene. According to the maximum of compressed data and the quantization table scale of the previous frame, a predicted curve can be obtained by a linear interpolation method performed on the three scenic curves.

According to the predicted curve and the maximum of compressed data in the stable state, a target quantization table scale can be obtained. A difference between the target quantization table scale and the current quantization table scale of the predicted curve is referred to, so as to determine a stride of adjustment. Whether the position of the maximum of compressed data is in a stable area determines the direction of adjustment. A compression rate of the current frame is finally determined by the stride of adjustment and the direction of adjustment. In the imaging device, the video is compressed according to the compression rate and outputted to a host via a connection interface.

Preferably, the maximum of compressed data is the maximum obtained by performing compression on a preset number of pixels as a unit of each of the frames of the video. The maximum can be updated after frame loss or the previous frame is compressed.

Further, when the maximum of compressed data of the previous frame of the video is determined lying in a stable range, the compression rate for the current frame needs not to be adjusted. When the maximum of compressed data of the previous frame of the video is determined lying in an under-compression range, the quantization table scale can be magnified for reducing amount of data so as to adjust the maximum of compressed data toward the stable range. When the maximum of compressed data of the previous frame of the video is determined lying in an over-compression range, the quantization table scale can be minified for increasing amount of data so as to adjust the maximum of compressed data toward the stable range.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a method for video compression based on an adaptive compression rate, and a circuit system thereof. The method can be applied to MJPEG (motion JPEG, Motion Joint Photographic Experts Group) video compression for adaptively adjusting a compression rate thereof according to degree of complexity of images. The adaptive compression rate allows the compressed images to be presented with a best visual effect while meeting a bandwidth limitation.

For the above discussed shortcomings of the conventional technologies of MJPEG video compression, provided in the disclosure is the method applied to MJPEG video compression with an adaptive compression rate. The method is particularly adapted to an image signal processor in an imaging device. It should be noted that the conventional MJPEG video compression technology usually uses a fixed compression rate in a compression process. However, the compression process using the fixed compression rate may ignore related information between the adjacent frames for simplifying the compression process with the fixed compression rate. The cost of simplifying the compression process is to have poor scene adaptability and a larger compression size. Therefore, for solving the adaptability to various scenes having different degrees of complexity, in the method for video compression based on an adaptive compression rate of the present disclosure, a quantization table scale can be adaptively adjusted according to volume of information of each of frames in the video and prior statistical information. The compression rate used for video compression is based on an adaptive compression rate.

According to one of the objectives of the method for video compression based on an adaptive compression rate of the present disclosure, the method enhances adaptability of the MJPEG video compression for adapting to various scenes. The method is used to adaptively adjust a video compression rate based on a complexity of a scene so as to perform video compression under a bandwidth limitation. The adaptive compression rate allows the circuit system to prevent frame loss due to insufficient compression and increase the compression rate as much as possible for providing better quality video without frame loss.

Figure 3:
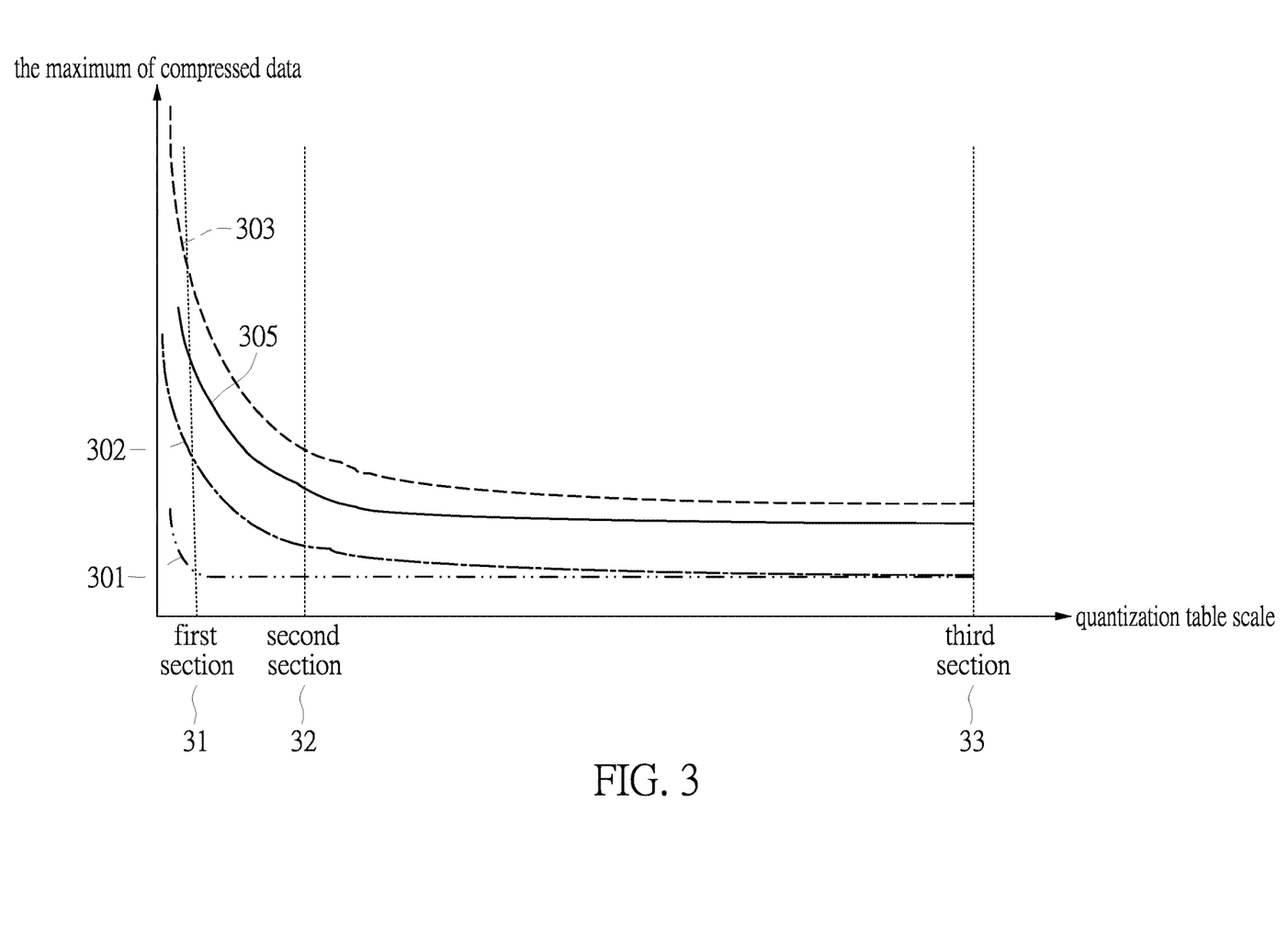
FIG. 3 shows several curves depicting relationships between the maximum of compressed data for different scenes and quantization table scale according to one embodiment of the present disclosure.
Figure 4:
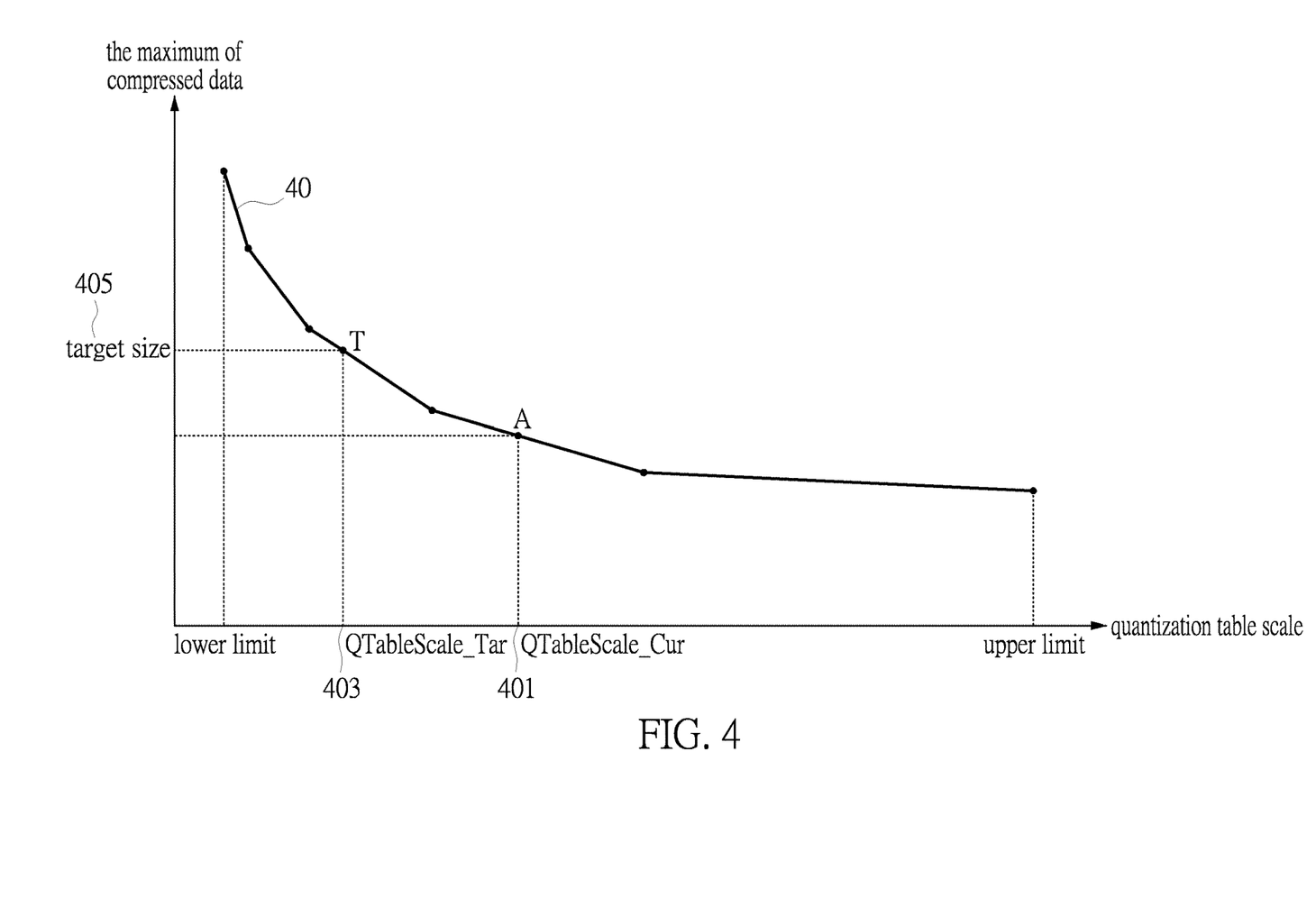
FIG. 4 is a schematic diagram showing a piecewise linear function of a predicted curve according to one embodiment of the present disclosure.
Figure 5:
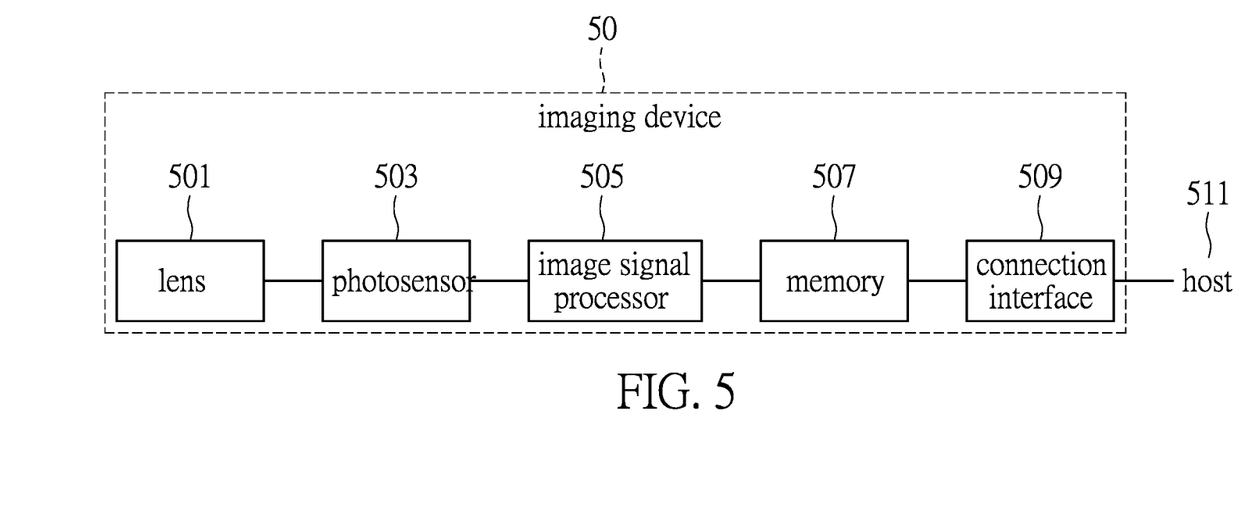
FIG. 5 is a schematic diagram depicting an imaging device that employs a circuit system performing a method for video compression based on an adaptive compression rate according to one embodiment of the present disclosure.

In an aspect, the method for video compression based on an adaptive compression rate can be applied to an imaging device which uses a universal serial bus (USB) to transmit an MJPEG video. The imaging device includes an image signal processor (ISP). Reference is made to FIG. 5, which shows a circuit block diagram according to one embodiment of the present disclosure. The steps of the method can be referred to the flow charts shown in FIG. 6 and FIG. 7. FIG. 1 through FIG. 4 provide examples to illustrate the method for video compression with an adaptive compression rate according to the embodiments of the present disclosure.

Figure 6:
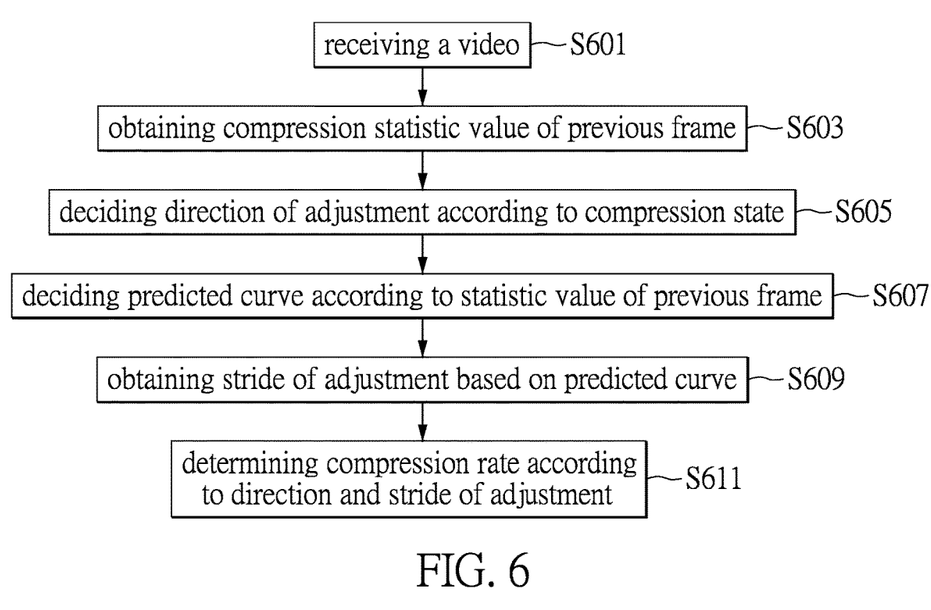
FIG. 6 is a flow chart describing the method for video compression based on the adaptive compression rate according to one embodiment of the present disclosure.

The main concept of the method for video compression can be firstly referred to the flow chart shown in FIG. 6. The method can be applied to the circuit system schematically shown in FIG. 5. In the circuit system, a digital signal processor is used to perform a software process or a firmware process. In the method, the circuit system receives a video (step S601, FIG. 6). The digital signal processor processes the video data so as to extract information from a previous frame of the video and process the current frame. A statistical data regarding compression can be obtained from volume of information of a previous frame, in which a maximum of compressed data of the previous frame can be obtained when a preset number of pixels (e.g., 8 lines of pixels) as a unit of the previous frame are compressed with an initial compression rate (step S603). A compression state of the previous frame can be determined according to the maximum of compressed data of the previous frame. The compression state can be a stable compression state, an under-compression state or an over-compression state. Therefore, a direction to adjust the compression rate can be determined according to the compression state of the previous frame so as to make the compression state of the current frame tending toward a stable compression state. The adjusted compression rate allows the compression data size of the current frame to tend to a target compression data size (step S605), and can be referred to as in FIG. 2.

After the direction to adjust the compression rate is determined, a stride of adjustment to adjust the compression rate is then determined in the following method. When the circuit system obtains the statistical value of the previous frame, e.g., the maximum of compressed data and the quantization table scale of the previous frame, a predicted curve can be determined by a mathematical method such as an interpolation method based on the relationship curves with respect to a simple scene, a normal scene and a complex scene (step S607). The predicted curve is used to determine the stride of adjustment for adjusting the compression rate toward a target value (step S609). In particular, for rendering the predicted curve based on the statistical value of the previous frame, relationship curves for illustrating relations of maximum of compressed data and quantization table scale under multiple scenes such as the simple scene, the normal scene and the complex scene are introduced. The predicted curve is obtained according to the maximum of compressed data and the quantization table scale of the previous frame based on the abovementioned relationship curves. A target quantization table scale is therefore obtained. The stride of adjustment can be obtained by referring to the quantization table scale of the previous frame and the target quantization table scale.

Finally, a compression rate is determined according to the direction of adjustment and the stride of adjustment (step S611). That is, when referring to the statistical data of the previous frame, the quantization table scale can be adjusted for frame-by-frame adjusting the compression rate.

According to one embodiment of the method for video compression, the method can be applied to an electronic device that needs to perform video compression. FIG. 5 shows an example of an electronic device including a circuit system for performing the method for video compression based on an adaptive compression rate.

The imaging device 50 is a device for processing video data. The video data is generated by capturing frame images through a lens 501 and a photosensor 503 of the electronic device. A digital signal processor 505 of the circuit system performs the method for video compression based on an adaptive compression rate by means of software or firmware. The processed data can be stored to a memory 507 and then outputted via a connection interface 509.

The connection interface 509 can be a wired or a wireless communication interface used to connect to an external host 511. The connection interface 509 is such as a universal serial bus (USB). The limitation of a bandwidth of the connection interface 509 is one of factors that form the limitations of video transmission. Through the adaptive quantization table scale, the method for video compression can use the bandwidth of the connection interface 509 adequately. The image signal processor 505 is used to perform the method for video compression based on an adaptive compression rate for determining a compression rate with respect to a current frame and producing a video which is compressed with the compression rate. The video is then transmitted to the host 511. The host 511 then provides the video to be played after decompressing the video.

The following descriptions and drawings are related to the examples of the method for video compression based on an adaptive compression rate.

For example, with 8 lines of pixels as a unit to be compressed in a digital signal processor as an example, a maximum (8LineMaxSize) of the compressed data of the 8 lines of pixels of every frame is obtained after a video is received. The maximum of compressed data acts as a statistical value that is used to measure a volume of information of the current frame. The statistical value can be updated after frame loss or one of the frames is compressed.

For embodying adjustment of the adaptive compression rate, a target size is provided. An upper limit and a lower limit for adjusting the target size for every frame in the video can be referred to an adjustment policy as illustrated in equation 1.

$$\begin{cases} SizeTarget\_H = (1 + StableRange) \times \\ \quad (UpperSize \times SizeTargetRatio) \\ SizeTarget\_L = (1 - StableRange) \times \\ \quad (UpperSize \times SizeTargetRatio) \end{cases} \quad \text{Equation 1}$$

Equation 1 shows an algorithm for calculating a high target size (SizeTarget_H) and a low target size (SizeTarget_L) based on the target size (SizeTarget). The "UpperSize" indicates an upper limit of data transmission formed by the connection interface within a period of time when the digital signal processor processes 8 lines of pixels. During a practical operation, a certain amount of bandwidth tolerance is reserved. For example, the target size setting for video compression can be regarded as 70% of the upper limit of data transmission (UpperSize) due to the limitation of the connection interface. That is, "SizeTargetRatio"=70% in equation 1.

Figure 1:
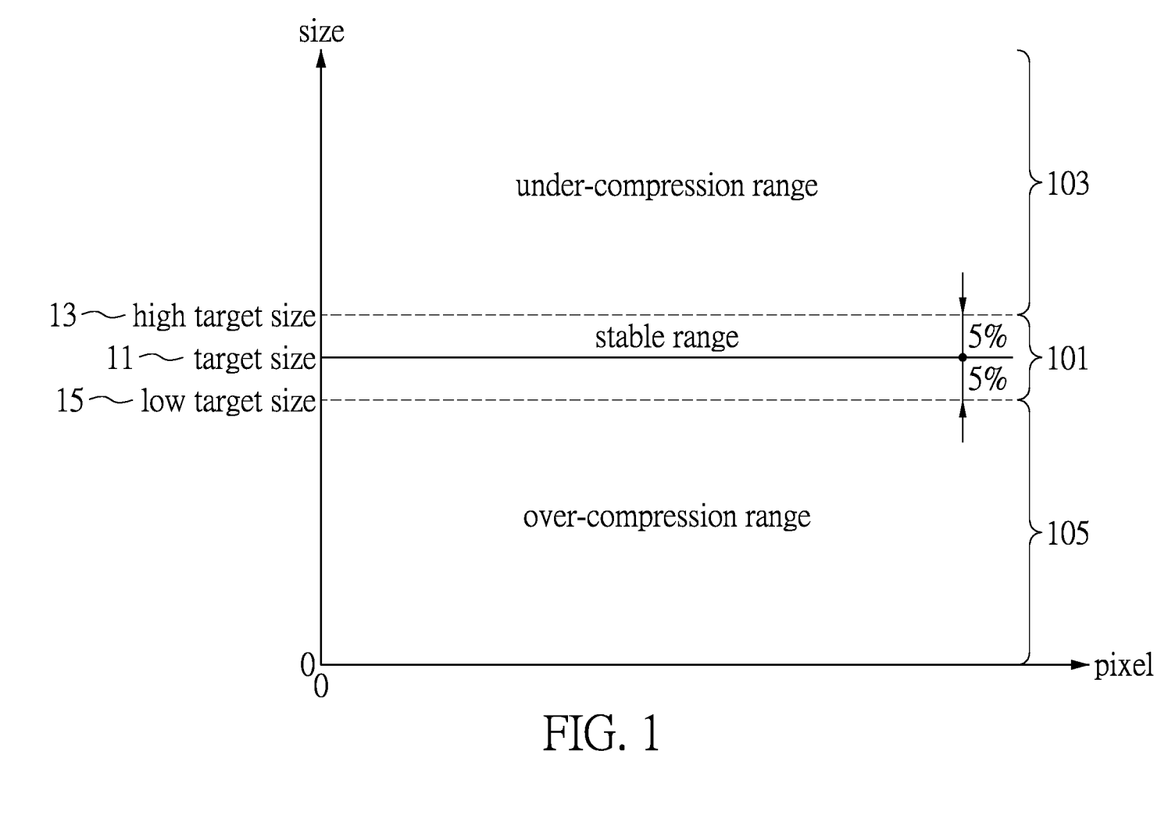
FIG. 1 is a schematic diagram showing a target size for video compression.

In the method, a target size is referred to for defining several compression ranges. Reference is made to FIG. 1, which is a schematic diagram depicting target sizes for video compression. A stable range 101 is defined between an up ratio and a down ratio (e.g., the up ratio is 5% and the down ratio is 5%) based on a target size (SizeTarget) 11. The upper limit of the stable range 101 can be a high target size (SizeTarget_H) 13, and the lower limit of the stable range 101 is a low target size (SizeTarget_L) 15. An under-compression range 103 is defined in an upper range larger than a percentage (e.g., StableRange=5%) above the stable range 101. The under-compression range 103 represents a range indicative of a relatively small compression rate. An over-compression range 105 is defined in a lower range smaller than a percentage (e.g., StableRange=5%) below the stable range 101. The over-compression range 105 represents another range indicative of a relatively high compression rate.

Figure 2:
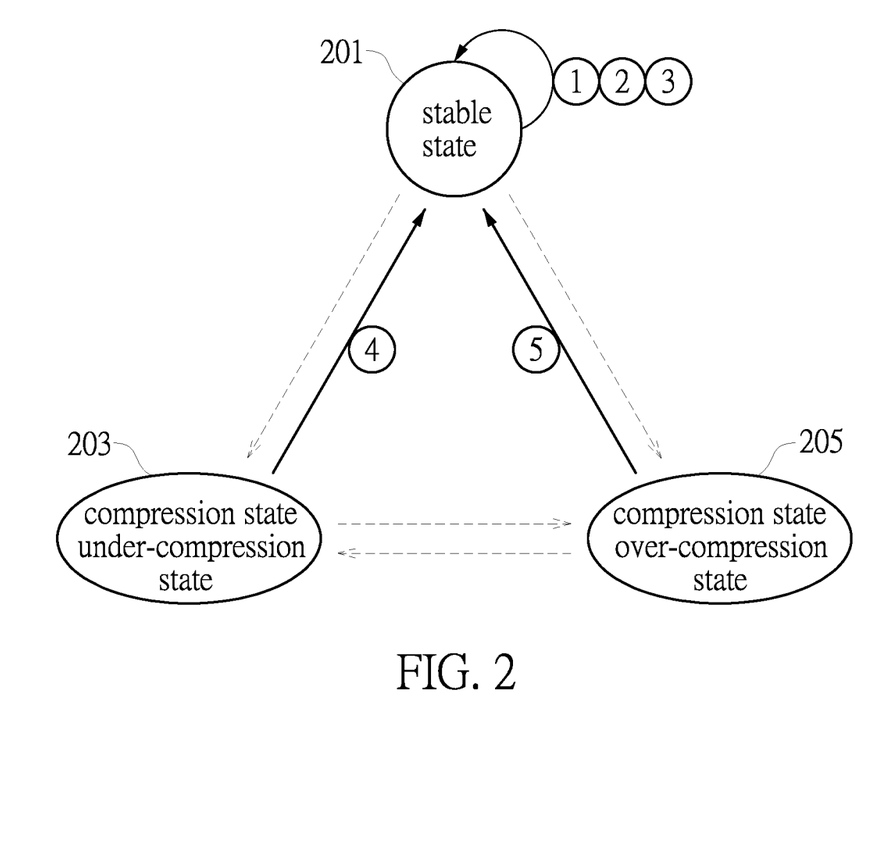
FIG. 2 is a schematic diagram depicting a state machine that is used to determine an adjustment policy for a compression rate.

Next, according to the upper limit and the lower limit of a target size shown in FIG. 1, the compression rate for the video can be adaptively adjusted. The method is generally based on the well-defined stable range 101, under-compression range 103 and over-compression range 105. In view of equation 1, the adjustment policy can be referred to in the following embodiments. Reference is further made to FIG. 2, which is a schematic diagram depicting a state machine used to describe the adjustment policy for adjusting the video compression rate.

According to volume of information of every frame, if the maximum of compressed 8 lines of pixels (8LineMaxSize) lies in the stable range 101, as shown in FIG. 1, that is between a high target size 13 and a low target size 15, it can be represented as "SizeTarget_L≤8LineMaxSize≤SizeTarget_H." It can be inferred that it is not necessary to adjust the compression rate of the current frame since the current frame is in a stable state (201, FIG. 2).

Further, if the maximum of compressed data of the previous frame lies in the under-compression range 103, as shown in FIG. 1, that is the range larger than the high target size 13, it can be represented as "8LineMaxSize>SizeTarget_H." It can be inferred that the current frame is in an under-compression state (203, FIG. 2). For making the compression rate toward the stable state (201, FIG. 2), the quantization table scale (QTableScale) can be magnified according to the method for video compression based on an adaptive compression rate for reducing an amount of data.

Yet further, if the maximum of compressed data of the previous frame lies in the over-compression range 105, as shown in FIG. 1, that is the range smaller than the low target size 15, it can be represented as "8LineMaxSize<SizeTarget_L." It can be inferred that the current frame is in an over-compression state (205, FIG. 2). In the method, the quantization table scale (QTableScale) is minified for increasing an amount of data and increasing a utilization ratio of a buffer in the connection interface, e.g., a buffer in a serial interface engine. Therefore, a higher quality video can be obtained.

It should be noted that an amount of magnifying or minifying the quantization table scale is limited by an upper limit and a lower limit Reference is made to FIG. 2, a process incorporating an adjustment policy depicted by a state machine based on the stable state, the under-compression state and the over-compression state is shown. The broken lines shown in the diagram represent state transition when the scene changes and the solid lines represent the directions of adjustment.

Because the scenes in an ordinary video are not always the same, the method for video compression based on an adaptive compression rate embodies adaptive quantization table scale based on the volume of information and statistic data of every frame and is able to provide a better quality video when being adapted to various scenes. Thus, the broken lines shown in FIG. 2 show that the maximum of compressed data of the frame can be transferred among the stable state 201, the under-compression state 203 or the over-compression state 205 when the scene of the video changes. The compression rate for the frame is also adjusted adaptively with the adjustment of the quantization table scale. However, since the quantization table scale cannot be adjusted unlimitedly, the upper limit (ScaleMax) and the lower limit (ScaleMin) are used for limiting the adjustment of the quantization table scale. Three scenarios equivalent to the three states (201, 203 and 205) are illustrated in equations 2, 3 and 4. The stable state is met if any of the scenarios is satisfied.

With a digital signal processor which performs compression upon the 8 lines of pixels as a unit as an example, the stable state can be defined in equation 2. A first scenario is that, when the maximum of compressed data of the 8 lines of pixels (8LineMaxSize) is in between a low target size (SizeTarget_L) and a high target size (SizeTarget_H), the compressed current frame lies in a stable state. A second scenario is that, when the maximum of compressed data of the 8 lines of pixels (8LineMaxSize) is greater than or equal to a high target size (SizeTarget_H), and the quantization table scale (QTableScale) is equal to an upper limit (Scale-Max), the compressed current frame also lies in a stable state. A third scenario is that, when the maximum of compressed data of the 8 lines of pixels (8LineMaxSize) is less than or equal to a low target size (SizeTarget_L), and the quantization table scale (QTableScale) equals to a lower limit (ScaleMin), the compressed current frame also lies in a stable state.

Equation 2:

$$\text{SizeTarget}\_L \leq \text{8LineMaxSize} \leq \text{SizeTarget}\_H \qquad 1.$$

$$\begin{aligned}&(\text{8LineMaxSize} \geq \text{SizeTarget}\_H) \&\& \\ &\quad (\text{QTableScale} = \text{ScaleMax}) \end{aligned} \qquad 2.$$

$$\begin{aligned}&(\text{8LineMaxSize} \geq \text{SizeTarget}\_L) \&\& \\ &\quad (\text{QTableScale} = \text{ScaleMin}) \end{aligned} \qquad 3.$$

The under-compression state can be defined by equation 3. Under the fourth scenario, the compressed current frame is in an under-stable state when the maximum of compressed data of 8 lines of pixels (8LineMaxSize) is higher than the high target size (SizeTarget_H), and the quantization table scale (QTableScale) is smaller than an upper limit (ScaleMax) of the quantization table scale.

Equation 3:

$$\begin{aligned}&(\text{8LineMaxSize} > \text{SizeTarget}\_H) \&\& \\ &\quad (\text{QTableScale} < \text{ScaleMax}) \end{aligned} \qquad 4.$$

The over-compression state can be defined by equation 4. Under the fifth scenario, the compressed current frame is in an over-stable state when the maximum of compressed data of 8 lines of pixels (8LineMaxSize) is lower than the low target size (SizeTarget_L), and the quantization table scale (QTableScale) is greater than a lower limit (ScaleMin) of the quantization table scale.

Equation 4:

$$\begin{aligned}&(\text{8LineMaxSize} < \text{SizeTarget}\_L) \&\& \\ &\quad (\text{QTableScale} > \text{ScaleMin}) \end{aligned} \qquad 5.$$

The above-described scenarios can be applied to a state machine for adjustment policy shown in FIG. 2. The state machine can be used to obtain a direction of adjustment. In addition, a stride of adjustment is also required to be obtained. Reference is made to FIG. 3, which shows a curve diagram illustrating relationships between the maximum of compressed data of a preset number of lines of pixels under various scenes and the quantization table scale according to one embodiment of the present disclosure. The curves shown in the diagram illustrate the relationships between the maximum of compressed data of multiple lines of pixels and quantization table scale (QTableScale) under a first scene 301 (e.g., a simple scene), a second scene 302 (e.g., a normal scene) and a third scene 303 (e.g., a complex scene). The maximum of compressed data is such as the maximum of compressed 8 lines of pixels. It should be noted that the horizontal axis of the curve diagram indicates the quantization table scale and the vertical axis thereof indicates the maximum of compressed data.

Based on the relationships between multiple scenes such as the first scene 301 (e.g., a simple scene), the second scene 302 (e.g., a normal scene) and the third scene 303 (e.g., a complex scene) shown in FIG. 3, the statistical value such as the maximum of compressed data (e.g., 8LineMaxSize) and the quantization table scale (QTableScale) of the previous frame can be used to obtain a predicted curve 305 by performing a linear interpolation method upon the statistical values of the three curves. The predicted curve 305 acts as a model curve for the subsequent calculation. As the dotted lines shown in FIG. 3, the curves are approximated to a piecewise linear functions within a range "QTableScale∈[1, 255]" including a first section 31, a second section 32 and a third section 33. The intervals between the sections 31, 32 and 33 are smaller if the quantization table scale (i.e., the horizontal axis) is smaller. Conversely, the intervals between the sections 31, 32 and 33 are larger if the quantization table scale is larger. FIG. 4 shows a piecewise linear function (horizontal axis: quantization table scale; vertical axis: the maximum of compressed data) for the predicted curve according to one embodiment of the disclosure.

According to the prediction curve 40 shown in FIG. 4, with the digital signal processor performing compression upon 8 lines of pixels as an example, if the maximum of compressed data of 8 lines of pixels (8LineMaxSize) of the previous frame is "A", which indicates a state of the previous frame, the corresponding quantization table scale is labeled as "401" (QTableScale_Cur). According to the predicted curve 40, the target size (SizeTarget) 405 under the stable state (201, FIG. 2) T corresponds to the target quantization table scale (QTableScale_Tar) 403.

However, if the target size 405 and the predicted curve 40 do not intersect, and the predicted curve 40 is below the target size 405, the scene is determined as being too simple. In the meantime, the target quantization table scale (QTableScale_Tar) 403 is set to be equal to the lower limit (ScaleMin) of the quantization table scale (i.e., QTableScale_Tar=ScaleMin). The stride of adjustment is represented as TuneStep=|QTableScale_Tar−QTableScale_Cur|. The compression size of the video can be adjusted to the stable range according to the direction of adjustment (e.g., the over-compression state is adjusted to the stable state) and the stride of adjustment (i.e., between 401 and 403).

Figure 7:
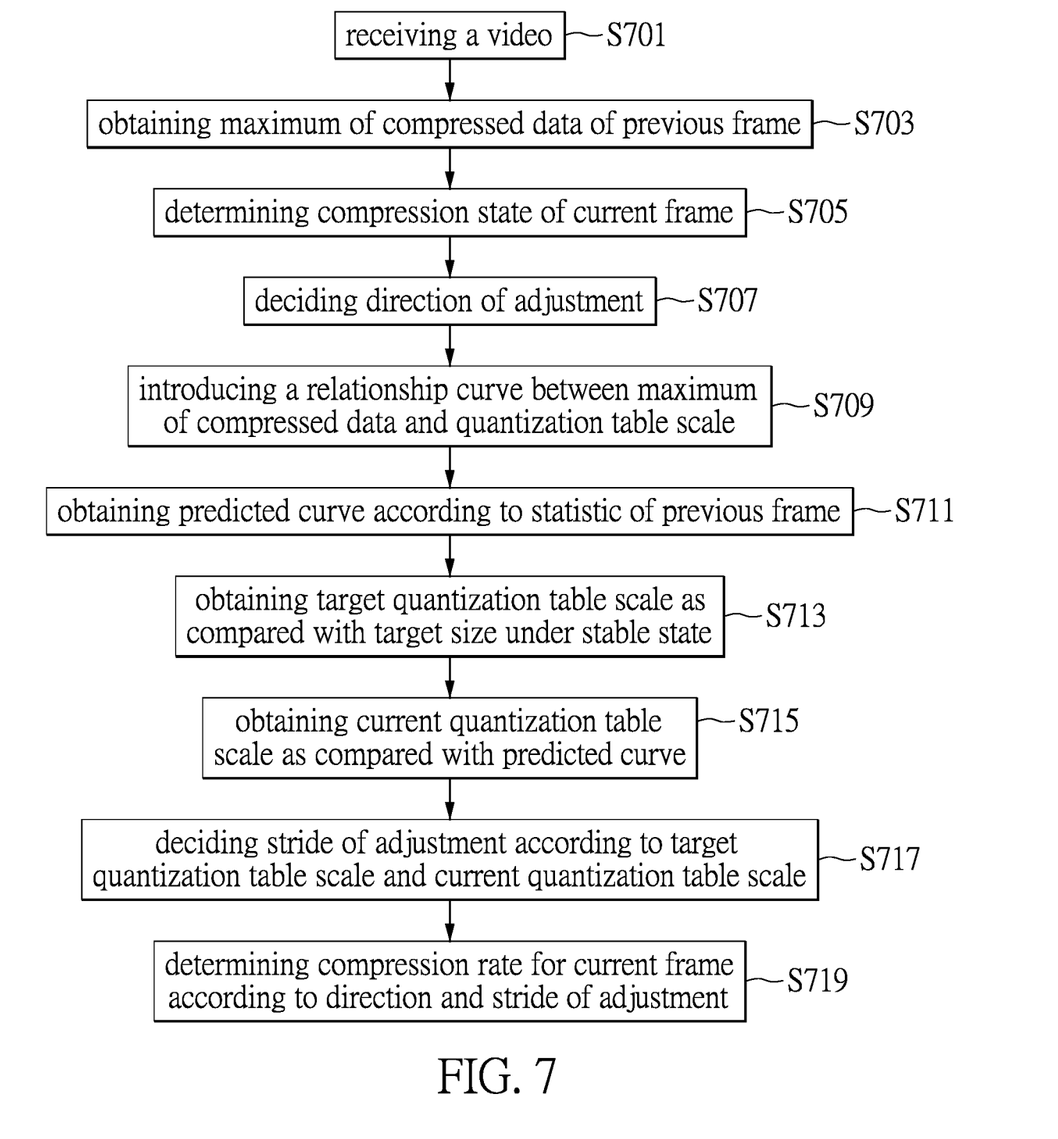
FIG. 7 is another flow chart describing the method for video compression based on the adaptive compression rate according to one embodiment of the present disclosure.

According to the above embodiment, reference is made to FIG. 7, which shows a flow chart describing the method for video compression based on an adaptive compression rate according to one embodiment of the present disclosure.

The predicted curve can be obtained according to a prior information for a specific scene, the quantization table scale of the previous frame and the maximum of compressed data of the previous frame. The predicted curve can be regarded as a model curve and can be updated after frame loss or the previous frame is compressed. An appropriate adjustment policy of the QScaleTable is adopted based on determination of the stable state, the under-compression state or the over-compression state. On one hand, the method can effectively enhance adaptability with respect to the various scenes for the MJPEG video compression technology and allow the circuit system to prevent frame loss due to insufficient compression. On the other hand, the method can make full use of bandwidth and improve video quality without frame loss and stuttering Reference is next made to FIG. 7, which shows a flow chart describing the method for video compression based on an adaptive compression rate based on the above embodiments.

The method is mainly performed by a digital signal processor in an imaging device. A video is received (step S701), and a maximum of compressed data of multiple lines of pixels of a previous frame is obtained (step S703). According to one of the embodiments, in the method, the maximum of compressed data can be obtained by performing compression upon a preset number of pixels (e.g., 8 lines of pixels) as a unit of each of frames of the video.

A compression state of the current frame can be determined based on the maximum of the compressed data of the previous frame. The compression state can be defined as the stable range, the under-compression range and the over-compression range as shown in FIG. 1 (step S705). Next, referring to the state machine of adjustment policy for a compression rate shown in FIG. 2, a direction of adjustment is determined according to the compression state of the current frame (step S707). In the meantime, as shown in FIG. 3, the curves depicting relationships between the maximum compressed data under multiple scenes and the quantization table scale are introduced (step S709).

The multiple scenes can be classified into a simple scene, a normal scene and a complex scene. The curves are processed by a linear interpolation method so as to render a predicted curve, as shown in FIG. 4 (step S711). As compared to the predicted curve shown in FIG. 4, a target size under a stable state can be obtained so as to provide a target quantization table scale (step S713). A current quantization table scale is obtained when corresponding to the statistical value of the previous frame over the predicted curve (step S715). A stride of adjustment is determined according to the target quantization table scale and the current quantization table scale (step S717). Finally, a compression rate for the current frame is determined based on the direction of adjustment and the stride of adjustment, and the compression rate is applied so as to perform video compression (step S719).

According to the flow described above, one of the objectives of the method for video compression based on an adaptive compression rate is to enhance adaptability of the MJPEG video compression technology, in which the compression rate is adaptively adjusted under a bandwidth limitation. The adaptive compression rate allows the circuit system to prevent frame loss due to insufficient compression and increase bandwidth utilization as much as possible for providing better quality video without frame loss.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for video compression based on an adaptive compression rate, comprising:
    receiving a video;
    obtaining a maximum of compressed data of a previous frame from the video;
    determining a compression state of a current frame according to the maximum of compressed data of the previous frame;
    determining a direction of adjustment to adjust a compression rate according to a compression state of the previous frame so as to cause a compression rate of the current frame to be closer to a target compression rate;
    introducing relationship curves between a maximum of compressed data under multiple scenes and a quantization table scale, and rendering a predicted curve according to the maximum of compressed data of the previous frame and a quantization table scale of the previous frame;

obtaining a current quantization table scale by comparing the maximum of compressed data of the previous frame with the predicted curve;

determining a stride of adjustment according to a difference between a target quantization table scale and the current quantization table scale of the predicted curve; and determining the compression rate of the current frame according to the direction of adjustment and the stride of adjustment, and compressing the video with the compression rate.

2. The method according to claim 1, wherein the maximum of compressed data is a maximum obtained by performing compression upon a preset number of pixels as a unit of each of frames of the video.

3. The method according to claim 2, wherein, when maximum of compressed data of each of the frames is obtained, the maximum of compressed data is updated after frame loss or after the previous frame is compressed.

4. The method according to claim 1, wherein a digital signal processor applying the method for video compression based on the adaptive compression rate performs compression upon 8 lines of pixels as a unit, and the maximum of compressed data is a maximum of the compressed 8 lines of pixels.

5. The method according to claim 1, wherein a target size, a high target size, and a low target size used to determine the compression state are determined according to an upper limit of data transmission and in view of a bandwidth tolerance which is reserved for practical operation.

6. The method according to claim 5, wherein a stable range is defined as a range based on the target size, an under-compression range is defined as a range higher the high target size, and an over-compression range is defined as a range lower the low target size.

7. The method according to claim 6, wherein, based on the well-defined stable range, the under-compression range and the over-compression range, the maximum of compressed data of each of the frames is used to determine the compression state as a stable compression state, an under-compression state, or an over-compression state.

8. The method according to claim 7, wherein, a target quantization table scale of the previous frame is obtained when comparing the target size in the stable range with the predicted curve, and the stride of adjustment is determined according to the target quantization table scale.

9. The method according to claim 8, wherein, when the maximum of compressed data of the current frame in the video is determined in the stable range, the compression rate for the current frame needs not to be adjusted.

10. The method according to claim 8, wherein, when the maximum of compressed data of the previous frame of the video is determined to be lying in the under-compression range, the quantization table scale is magnified for reducing amount of data, so as to adjust the compression rate toward the stable range.

11. The method according to claim 8, wherein, when the maximum of compressed data of the previous frame of the video is determined to be lying in the over-compression range, the quantization table scale can be minified for increasing amount of data so as to adjust the compression rate toward the stable range.

12. The method according to claim 11, wherein an amount of magnifying or minifying the quantization table scale is limited by an upper limit and a lower limit.

13. The method according to claim 7, wherein the maximum of compressed data of each of frames of the video shifts among the stable compression state, the under-compression state, and the over-compression state with change of the scene.

14. The method according to claim 13, wherein, in the step of introducing the curves depicting relationships between the maximum of compressed data under multiple scenes and the quantization table scale, the multiple scenes include a simple scene, a normal scene and a complex scene, and a predicted curve is obtained through a linear interpolation manner performed on curves of the three scenes.

15. A circuit system, comprising:
a digital signal processor, performing a method for video compression based on an adaptive compression rate through a software process or a firmware process, wherein the method includes:
receiving a video;
obtaining a maximum of compressed data of a previous frame from the video;
determining a compression state of a current frame according to the maximum of compressed data of the previous frame;
determining a direction of adjustment to adjust a compression rate according to a compression state of the previous frame so as to make a compression rate of the current frame toward a target compression rate;
introducing curves depicting relationships between maximum of compressed data under multiple scenes and the quantization table scale, and rendering a predicted curve according to a maximum of compressed data of the previous frame and a quantization table scale of the previous frame;
obtaining a current quantization table scale by comparing the maximum of compressed data of the previous frame with the predicted curve;
determining a stride of adjustment according to a difference between a target quantization table scale and the current quantization table scale of the predicted curve; and
determining the compression rate of the current frame according to the direction of adjustment and the stride of adjustment, and compressing the video with the compression rate.

16. The circuit system according to claim 15, wherein the circuit system is disposed in an imaging device, the video is acquired through a lens and a photosensor of the imaging device; wherein the imaging device outputs via a connection interface the video which is compressed with the compression rate determined by the method.

17. The circuit system according to claim 16, wherein, in the method for video compression based on the adaptive compression rate, a target size, a high target size and a low target size used to determine the compression state are determined according to an upper limit of data transmission due to limitation of the connection interface in view of a bandwidth tolerance which is reserved for practical operation.

18. The circuit system according to claim 17, wherein the stable range is defined based on the target size, an under-compression range is defined as a range higher than the high target size, and an over-compression range is defined as a range lower than the low target size.

19. The circuit system according to claim 18, wherein the target quantization table scale of the previous frame is obtained when comparing the target size in the stable range with the predicted curve, and the stride of adjustment is determined according to the target quantization table scale.

20. The circuit system according to claim 18, wherein, based on the well-defined stable range, the under-compression range and the over-compression range, the maximum of compressed data of each of frames is used to determine the compression state as a stable compression state, an under-compression state, or an over-compression state.

* * * * *